US008843899B2

(12) United States Patent
Bates et al.

(10) Patent No.: US 8,843,899 B2
(45) Date of Patent: Sep. 23, 2014

(54) IMPLEMENTING A STEP-TYPE OPERATION DURING DEBUGGING OF CODE USING INTERNAL BREAKPOINTS

(75) Inventors: Cary L. Bates, Rochester, MN (US); David L. Hermsmeier, Oronoco, MN (US); Paula A. Kavanagh, Raleigh, NC (US); Rodney L. Rabe, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/915,288

(22) Filed: Oct. 29, 2010

(65) Prior Publication Data

US 2012/0110553 A1    May 3, 2012

(51) Int. Cl.
    G06F 9/44    (2006.01)
(52) U.S. Cl.
    USPC ........... 717/129; 717/124; 717/125; 717/127; 717/128
(58) Field of Classification Search
    None
    See application file for complete search history.

(56) References Cited

U.S. PATENT DOCUMENTS

| | | |
|---|---|---|
| 4,819,234 A | 4/1989 | Huber |
| 6,249,907 B1 | 6/2001 | Carter et al. |
| 6,477,664 B1 | 11/2002 | Hong |
| 6,681,384 B1 | 1/2004 | Bates et al. |
| 6,708,326 B1 | 3/2004 | Bhattacarya |
| 6,862,694 B1 * | 3/2005 | Tormey et al. .................. 714/34 |
| 6,978,399 B2 | 12/2005 | Bates et al. |
| 7,000,225 B2 | 2/2006 | Sangavarapu et al. |
| 7,007,268 B2 | 2/2006 | Emberson |
| 7,047,519 B2 | 5/2006 | Bates et al. |
| 7,080,360 B2 | 7/2006 | Bates et al. |
| 7,162,664 B2 | 1/2007 | Haselden et al. |
| 7,178,136 B2 | 2/2007 | Morgan |
| 7,203,926 B2 | 4/2007 | Bogle et al. |
| 7,640,538 B2 | 12/2009 | Bennett et al. |
| 7,836,430 B2 | 11/2010 | Shebs |
| 8,087,002 B2 | 12/2011 | Fjeldstad et al. |
| 8,141,046 B2 | 3/2012 | Bates et al. |
| 8,196,107 B2 | 6/2012 | Stall et al. |

(Continued)

OTHER PUBLICATIONS

Debugging with GDB, published 2002 (hereinafter "GDB") (http://ftp.gnu.org/old-gnu/Manuals/gdb-5.1.1/html_node/gdb_toc.html).*

(Continued)

*Primary Examiner* — Don Wong
*Assistant Examiner* — Deric Ortiz
(74) *Attorney, Agent, or Firm* — Heslin Rothenberg Farley & Mesiti P.C.

(57) ABSTRACT

Debugging of code of a computer program is facilitated by implementing a step-type operation using internal breakpoints to ensure debugger control of the code. During a debugging session, a step-type operation is implemented by setting active internal breakpoints on every line of code of every routine currently on the call stack referenced by the processor and on entry points of the code being debugged, and subsequently leaving in place, upon completion of the step-type operation, active internal breakpoints. Subsequent to implementing the step-type operation any active internal breakpoints encountered during execution of one or more other operations of the code and deemed unnecessary to completion of the other operation(s) are disabled, and the location of any internal breakpoints disabled during execution of the one or more other operations are tracked in a data structure(s) for subsequent use in reestablishing needed internal breakpoints for implementation of another step-type operation.

18 Claims, 9 Drawing Sheets

(56) References Cited

U.S. PATENT DOCUMENTS

| | | |
|---|---|---|
| 8,261,240 B2 | 9/2012 | Hoban et al. |
| 8,423,829 B2 | 4/2013 | Yamagata et al. |
| 8,429,622 B2 | 4/2013 | Nanjundaswamy |
| 2002/0100024 A1 | 7/2002 | Hunter et al. |
| 2003/0005415 A1 | 1/2003 | Bates et al. |
| 2003/0061599 A1 | 3/2003 | Bates et al. |
| 2003/0106046 A1 | 6/2003 | Arnold et al. |
| 2003/0115576 A1 | 6/2003 | Bates et al. |
| 2003/0149961 A1 | 8/2003 | Kawai et al. |
| 2003/0188225 A1 | 10/2003 | Bates et al. |
| 2004/0268183 A1 | 12/2004 | Haselden et al. |
| 2005/0034024 A1 | 2/2005 | Alverson et al. |
| 2005/0060690 A1 | 3/2005 | Tung et al. |
| 2005/0066313 A1 | 3/2005 | Bates et al. |
| 2005/0154813 A1 | 7/2005 | DeWitt et al. |
| 2005/0229163 A1 | 10/2005 | Bates et al. |
| 2005/0283674 A1 | 12/2005 | Rivard et al. |
| 2006/0064677 A1 | 3/2006 | Bickson et al. |
| 2006/0200807 A1 | 9/2006 | Bates et al. |
| 2006/0225042 A1 | 10/2006 | Bennett et al. |
| 2007/0074168 A1 | 3/2007 | Bates et al. |
| 2007/0168972 A1 | 7/2007 | Bates et al. |
| 2007/0168994 A1* | 7/2007 | Barsness et al. ............... 717/129 |
| 2007/0168996 A1 | 7/2007 | Klein |
| 2007/0250819 A1* | 10/2007 | Fjeldstad et al. ............... 717/129 |
| 2007/0266376 A1 | 11/2007 | Yim et al. |
| 2007/0277165 A1 | 11/2007 | Stall et al. |
| 2009/0089756 A1 | 4/2009 | Danton et al. |
| 2009/0150870 A1 | 6/2009 | Bates |
| 2011/0258579 A1 | 10/2011 | Nanjundaswamy |
| 2011/0321017 A1 | 12/2011 | Kapoor et al. |
| 2012/0079459 A1 | 3/2012 | Bates et al. |
| 2012/0110554 A1 | 5/2012 | Bates et al. |
| 2012/0110555 A1 | 5/2012 | Bates et al. |

OTHER PUBLICATIONS

U.S. Appl. No. 12/915,301, entitled "Step-Type Operation Processing During Debugging by Machine Instruction Stepping Concurrent With Setting Breakpoints," filed Oct. 29, 2010 by Cary L. Bates et al.

U.S. Appl. No. 12/915,357, entitled "Varying Removal of Internal Breakpoints During Debugging of Code," filed Oct. 29, 2010 by Cary L Bates et al.

U.S. Appl. No. 12/893,195 entitled, "Tracing Multiple Threads Via Breakpoints," filed Sep. 29, 2010 by Cary L. Bates et al.

Bates et al., Office Action for U.S. Appl. No. 12/893,195, filed Sep. 29, 2010 (U.S. Patent Publication No. 2012/0079459 A1), dated Nov. 26, 2012.

Bates et al., Office Action for U.S. Appl. No. 12/915,301, filed Oct. 29, 2010 (U.S. Patent Publication No. 2012/0110554 A1), dated Dec. 10, 2012.

Nathan Sidwell et al., "Non-Stop Multi-Threaded Debugging in GDB," Nov. 20, 2007, pp. 1-11.

Bates et al., Final Office Action for U.S. Appl. No. 12/915,357, filed Oct. 29, 2010 (U.S. Patent Publication No. 2012/0110555 A1), dated Dec. 18, 2013 (24 pages).

Bates et al., Final Office Action for U.S. Appl. No. 12/915,301, filed Oct. 29, 2010 (U.S. Patent Publication No. 2012/0110554 A1), dated Dec. 30, 2013 (20 pages).

Nathan Sidwell et al., "Non-stop Multi-Threaded Debugging in GDB, "Nov. 20, 2007, pp. 1-11.

Bates et al., Office Action for U.S. Appl. No. 12/893,195, filed Sep. 29, 2010, (U.S. Patent Publication No. 2012/0079459 A1) dated Nov. 26, 2012, 35 pages.

Bates et al., Office Action for U.S. Appl. No. 12/893,195, filed Sep. 29, 2010, (U.S. Patent Publication No. 2012/0079459 A1) dated Apr. 11, 2013, 33 pages.

Bates et al., Office Action for U.S. Appl. No. 12/893,195, filed Sep. 29, 2010, (U.S. Patent Publication No. 2012/0079459 A1), dated Feb. 27, 2014 (35 pages).

Bates et al., Office Action for U.S. Appl. No. 12/915,357, filed Oct. 29, 2010 (U.S. Patent Publication No. 2012/0110555 A1), dated Jun. 11, 2013 (21 pages).

Bates et al., Notice of Allowance for U.S. Appl. No. 12/915,301, filed Oct. 29, 2010 (U.S. Patent Publication No. 2012/0110554 A1), dated Mar. 31, 2014 (8 pages).

Vasudevan et al., "Stealth Breakpoints", Dept. Computer Science and Engineering, University of Texas at Arlington, Proceedings of the 21st Annual Computer Security Applications Conference (ACSAC 2005) (10 pages).

* cited by examiner

IMPLEMENTING A STEP-TYPE OPERATION DURING DEBUGGING OF CODE USING INTERNAL BREAKPOINTS

BACKGROUND

The present invention relates generally to data processing, and more particularly, to software development, including techniques for facilitating debugging of code of a computer program.

A programmer conventionally develops a software program using a text editor to create source code files. From these source code files, an executable program is generated by translating the source code files into an executable program or machine code. The process of generating the executable program from the source code may involve the use of several software programs. These programs typically include a compiler for translating the source code into machine code and a linker to link the machine code together to form the executable program.

Source code files of a computer program may include thousands, if not millions, of lines of source code, often spread across many files. Because of this complexity, software programs may contain errors that manifest themselves during program execution. Accordingly, a debugging tool has been an essential tool of software development. Debugging involves testing and evaluating the software program to find and correct errors, including any improper logic operations. Typically, a debugging program allows a developer to monitor the execution of a computer program. Doing so assists the programmer in finding and correcting errors. A typical debugging system includes a combination of computer hardware and debugger software that executes the program being debugged in a controlled manner. Controlled debugger execution is facilitated, in part, using two operations: step functions and user breakpoints.

A "step" function permits a computer programmer to process lines (also referred to as "statements") in a computer program one-by-one, and to see the results upon completion of each line. To accomplish this, the debugger needs to maintain program control, which means that the program must be interrupted and the debugger notified when program execution reaches the next line or statement of a program that has been compiled to allow execution to be controlled by the debugger. Because of the rich features offered by many high level programming languages, it is often not tractable or possible for a debugger to predict which line will execute next. This is especially true when considering, for example, signals and try/catch/throw constructs, method calls, Run Time Library (RTL) routines such as setjmp( ) longjmp( ) and exit routines such as the one provided to the C RTL routine atexit( ).

On a zSeries® or System Z® computer system, offered by International Business Machines Corporation, of Armonk, N.Y., maintaining program control when stepping over these constructs can be involved. For these systems, software debuggers are conventionally dependent on programs being compiled in such a way that operating system "hooks" (referred to as EX hooks) are inserted in order for the debugger program to retain program control, for example, when performing a step operation. Unlike other operating systems, the zOS® system supports many linkage conventions, and does not provide support to notify the debugger program when a particular function is called. Plus many of the run-time routines exist in read only memory and are in fact shared by multiple users so there is no way for a debugger to set breakpoints to instruction step the user through these routines.

Thus, operating system hooks are inserted at compile time, and there may be more than one hook inserted per instruction. Many debuggers rely on such operating system hooks to retain control during a step operation. However, with the use of operating system hooks, the average program becomes larger when compiled for debugging. In addition, executing such a compiled program may result in the program running slower than the same program compiled without hooks. The reason for this is that, upon encountering a hook, even outside the debug environment, additional time is needed to execute the hook compared with regular program instructions. Due to this performance issue, there is an advantage to being able to limit the insertion of operating system hooks.

BRIEF SUMMARY

In one aspect, the shortcomings of the prior art are overcome and additional advantages are provided through the provision of a method of facilitating debugging of code of a computer program. The method includes: implementing by a processor, during a debugging session, a step-type operation, the implementing including: setting a plurality of active internal breakpoints on lines of code on a call stack referenced by the processor and on entry points of the code being debugged; and leaving in place, upon completion of the step-type operation, any active internal breakpoints.

In another aspect, computer program product is provided for facilitating debugging of code of a computer program. The computer program product includes a computer readable storage medium readable by a processor and storing instructions for execution by the processor for performing a method. The method includes: implementing by the processor, during a debugging session, a step-type operation, wherein the implementing includes: setting a plurality of active internal breakpoints on lines of code on a call stack referenced by the processor and on entry points of the code being debugged; and leaving in place, upon completion of the step-type operation, active internal breakpoints.

In another aspect, a computer system is provided for facilitating debugging of code of a computer program. The computer system includes: a memory; and a processor in communications with the memory, wherein the computer system is configured to perform a method. The method includes implementing by the processor, during a debugging session, a step-type operation, wherein the implementing includes: setting a plurality of active internal breakpoints on lines of code on a call stack referenced by the processor and on entry points of the code being debugged; and leaving in place, upon completion of the step-type operation, any active internal breakpoints.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
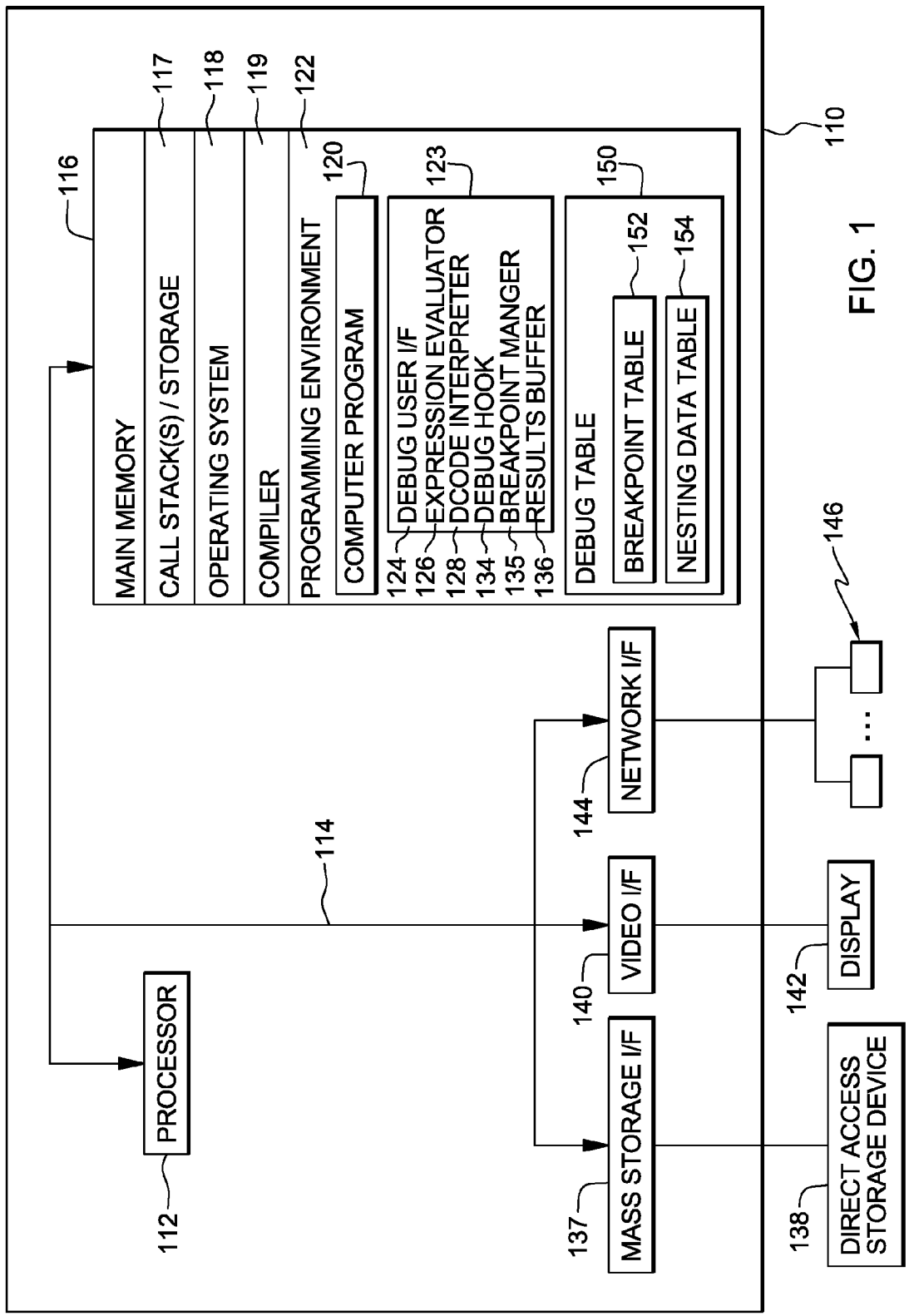
FIG. 1 is a high level diagram of a computer system configured with a debugging tool, in accordance with an aspect of the present invention.

The present invention generally provides methods, systems and computer program products for facilitating debugging code, and in particular, for maintaining debugger control of execution of a computer program when implementing a step-type operation. In one embodiment, the implementing includes setting active internal breakpoints on lines of code on a call stack referenced by the processor, and on any entry points of the code being debugged, and then leaving in place, upon completion of the step-type operation any active internal breakpoints. Thereafter, after implementing the step-type operation, active internal breakpoints encountered during execution of one or more other operations of code, and deemed unnecessary to completion of the other operation(s), are disabled. Data structures are employed in tracking the location of any active internal breakpoints disabled during execution of the one or more other operations. This facilitates subsequent fast re-establishing of those internal breakpoints as active internal breakpoints should the re-establishing be needed upon encountering another step-type operation.

One embodiment of the invention is implemented as a computer program product for use with a computer system such as, for example, the computing environment shown in FIG. 1 and described below. The program(s) of the computer program product define functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs comprise variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Referring to FIG. 1, a computer system 110 consistent with the invention is shown. Computer system 110 may represent any type of computer, computer system or other programmable electronic device, including a client computer, a server computer, a portable computer, an embedded controller, etc. The computer system 110 may be a standalone device or networked into a larger system. Moreover, those skilled in the art will appreciate that embodiments may be practiced with other computer system configurations including hand-held devices, multiprocessor systems, microprocessor-based or programmable consumer electronics, minicomputers, mainframe computers and the like. The embodiment may also be practiced in distributed computing environments where tasks are performed by remote processing devices that are linked through a communications network. In a distributed computing environment, program modules may be located in both local and remote memory storage devices. In one embodiment, the computer system 110 is a zSeries® computer system available from International Business Machines Corporation of Armonk, N.Y.

The computer system 110 could include a number of operators and peripheral systems such as shown; for example, by a mass storage interface (I/F) 137 operably connected to a direct access storage device 138, by a video interface 140 operably connected to a display 142, and by a network interface 144 operably connected to a plurality of networked devices 146. The display 142 may be any video output device for outputting a user interface. The networked devices 146 could be desktop or PC-based computers, workstations, network terminals, or other networked computer systems.

Computer system 110 is shown comprising at least one processor 112, which obtains instructions, or operation codes (also known as opcodes), and data via a bus 114 from a main memory 116. The processor 112 could be any processor adapted to support the debugging methods, systems and articles of manufacture of the invention. In particular, the computer processor 112 is selected to support the debugging features of the present invention. Illustratively, the processor is a PowerPC® available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device or on another computer coupled to the computer system 110 via bus 114.

As shown, the main memory 116 generally includes call stack(s)/storage 117, an operating system 118, a compiler 119 and a programming environment 122. The programming environment 122 comprises a computer program 120 to be debugged, a debugger program 123 and debug data 150. In one embodiment, the debug data 150 includes a breakpoint table 152 and a nesting data table 154. Embodiments of the breakpoint table 152 and the nesting data table 154 are described below.

The programming environment 122 facilitates debugging the computer program 120, or computer code, by providing tools for locating, analyzing and correcting faults. One such tool is the debugger program 123 (also referred to herein as the debugger). In one embodiment, the debugger 123 is a dbx debugger for a zOS® system modified according to the invention. The dbx debugger for the zOS® is available from International Business Machines Corporation of Armonk, N.Y.

Although the software constructs, such as the computer program 120 and the debugger 123, are shown residing on the same computer, a distributed environment is also contemplated. Thus, for example, the debugger 123 and the debug data 150 may be located on a networked device 146, while the computer program 120 to be debugged is on the computer system 110.

In a specific embodiment, the debugger 123 comprises a debugger user interface 124, expression evaluator 126, Dcode interpreter 128 (also referred to herein as the debug interpreter 128), a control point table 132, a debugger hook (also known as a stop handler) 134, a breakpoint manager 135 and a results buffer 136. Although treated herein as integral parts of the debugger 123, one or more of the foregoing components may exist separately in the computer system 110. Further, the debugger may include additional components not shown.

A debugging process is initiated by the debug user interface 124. The user interface 124 presents the program under debugging and highlights the current line of the program on which a stop or error occurs. The user interface 124 allows the user to set control points (e.g., user breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 126 parses the debugger command passed from the user interface 124 and uses a data structure (e.g., a table) generated by a compiler to map the line number in the debugger command to the physical memory address in memory 116. In addition, the expression evaluator 126 generates a Dcode program for the command. The Dcode program is machine executable language that emulates the commands.

The Dcode generated by the expression evaluator 126 is executed by the Dcode interpreter 128. The interpreter 128 handles expressions and Dcode instructions to perform various debugging steps. Results from Dcode interpreter 128 are returned to the user interface 124 through the expression evaluator 126. In addition, the Dcode interpreter 128 passes on information to the debug hook 134.

After the commands are entered, the user provides an input that resumes execution of the program 120. During execution, control is conventionally returned to the debugger 123 via the debug hook 134. The debug hook 134 is a code segment that returns control to the appropriate user interface. In some implementations, execution of the program eventually results in an event causing a trap to fire (e.g., a breakpoint is encountered). Control is then returned to the debugger by the debug hook 134 and program execution is halted. The debug hook 134 may then invoke the debug user interface 124 and may pass the results to the user interface 124. Alternatively, the results may be passed to the results buffer 136 to cache data for the user interface 124. In other embodiments, the user may input a command while the program is stopped, causing the debugger to run a desired debugging routine. Result values are then provided to the user via the user interface 124.

Figure 2:
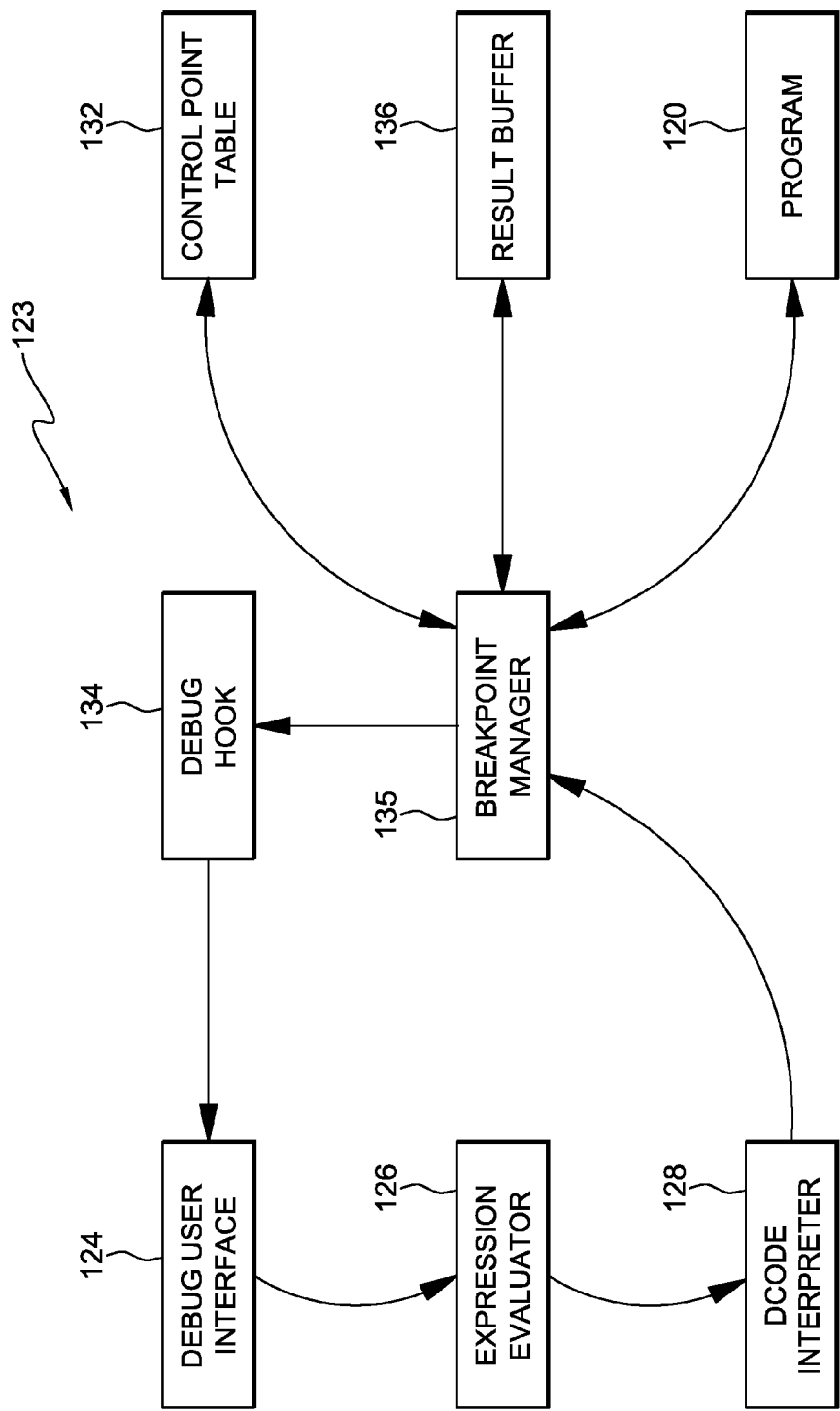
FIG. 2 is a block diagram illustration of one embodiment of the operation of a debugger, in accordance with an aspect of the present invention.

By way of example, one embodiment of a debugging processing is depicted in FIG. 2. In this example, the debugging process is initiated via the debug user interface 124. Debug user interface 124 presents the program under debugging and highlights the current line of the program on which a stop or error occurs. The debug user interface 124 allows the user to set control points (e.g., user breakpoints and user watch points), display and change variable values, etc. In certain instances, the user may define the commands by referring to high-order language (HOL) references such as line or statement number or software object references such as program or module names, from which the physical memory address may be cross-referenced.

The expression evaluator 126 parses the debugger command passed from the user interface 124 and uses a data structure (e.g., a table) generated by the compiler to map the line number of the debugger command to the physical memory address in memory. In addition, the expression evaluator 126 generates a Dcode program for the command. The Dcode program is machine executable language that emulates the commands.

The Dcode generated by the expression evaluator 126 is executed by the Dcode interpreter 128. The interpreter 128 handles expressions in Dcode instructions to perform various debugging steps. Results from Dcode interpreter 128 are returned to the debug user interface 124 through the expression evaluator 126. In addition, the Dcode interpreter 128 passes on information to the debug hook 134, for example, via the breakpoint manager 135.

After commands are entered, the user provides an input that resumes execution of the program 120 being debugged. During execution, control is conventionally returned to the debugger via the debug hook 134. The debug hook is a code segment that returns control to the appropriate user interface. In certain implementations, execution of the program eventually results in an event causing a trap to fire (e.g., a user breakpoint is encountered). Inserting and managing special opcodes that cause these traps to fire is the responsibility of the breakpoint manager 135 and is facilitated via one or more control point table(s) 132. When a trap fires, control is returned to the debugger by the debug hook 134 and program execution is halted. The debug hook 134 then invokes the debug user interface 124 and may pass the results to the user interface 124 (e.g., in the case of a user breakpoint). Alternatively, the results may be passed to the results buffer 136 to cache data for the user interface 124. In other embodiments, the user may input a command while the program is stopped, causing the debugger to run a desired debugging routine. Result values are then provided to the user via the debug user interface 124.

One of the most commonly used features of a debugger is a function which allows the user to step through a program being debugged. This feature allows the user to run to the beginning of the next line of code to be executed and stop. On most debuggers, there are several forms of the step operation. These various step operations are referred to herein as "step-type operations". The most common step-type operations are a "step over" function and a "step into" function. The step over function steps past a function call, then stops, and the step into stops on the next line of the called function.

To maintain program control software debuggers have traditionally relied on two distinct strategies:

1) Set/Sprinkle breakpoints on every line of the current routine and expect the operating system to notify the debugger when a stack frame is stacked or unstacked so it can sprinkle each line of the top frame with breakpoints to catch execution. When the step operation completes all breakpoints are removed.
2) Execute each machine instruction one by one until the start of a debuggable line is reached. On most hardware platforms it is possible to examine registers and predict the next instruction to be executed, or at least determine a vary small set of possible targets for any given branch. With a limited number of targets the debugger sets a breakpoint at each target and lets the program run, then removes the breakpoints once hit. This results in one instruction being executed at a time.

The first of these approaches requires that the operating system be actively involved in program execution and implies a hardware managed call stack be able to tell the debugger when a frame is stacked or unstacked. The second suffers from being slow especially if a substantial non-debuggable routine such as a RTL call must be stepped over. The second approach also has a problem running through read only code unless the operating system specifically provides support for the debugger to set breakpoints in read only code.

On a zSeries® or System Z® computer system, offered by International Business Machines Corporation, of Armonk, N.Y., neither of these classical approaches to implementing a step operation work. For these systems, software debuggers are conventionally dependent on programs being compiled in such a way that operating system "hooks" (referred to as EX hooks) are inserted in order for the debugger to retain program control when implementing a step-type operation. There may conventionally be one or more hooks inserted per statement.

As an alternative to using operating system hook support, a "step over" operation (such as the "next" sub-command) may be implemented by setting a breakpoint on each line of the current routine being debugged and each line of the calling routine. After the program is allowed to run and when one of the breakpoints is encountered the step over operation completes. When the operation completes, all breakpoints may be removed from the program and replaced the next time that the user steps. Advantageously, by setting the breakpoints in the current routine and its calling routine, the debugger will principally stop when the next line is reached.

The step sub-command is different because it must step into a called routine. To accomplish this, the debugger can single step each instruction looking for the next debuggable line. If it finds a branch instruction, it will follow the branch into the called routine. If it does not reach a debuggable line of code after so many instruction steps it can "sprinkle" breakpoints on each line of the current frame being debugged and each line of the calling routine and let the program run. This approach would work well for most situations, but there are several situations where such a debugger would still need to depend on operating system hooks to retain control. These situations include: signal handlers; setjmp longjmp invocations; try/catch/throw clauses; debuggable routines called from non-debuggable code (e.g., through qsort( ) or bsearch( )), where a function pointer is passed into non-debuggable code and later called; and non-standard control flow resulting from user created assembly routines. In such cases, hooks conventionally would need to be enabled to catch execution of the event during a step control transferred to a debuggable routine via one of these methods.

Operating system hooks, such as EX hooks, have certain disadvantages. For example, a typical ratio of regular instructions to hooks is about 6:1, and thus an average program may be approximately 20% larger when compiled with hooks for debugging. Also, executing such a program would result in the program running slower (e.g., up to 6 times slower) than the same program compiled without hooks. The reasons for this is that encountering one of these hooks, even outside the debug environment takes about the same time to execute as it takes to run approximately 30 regular instructions. In view of this performance hit, there is an advantage to implementing a hookless debug protocol for performing step-type operations. Disclosed herein below are methods of facilitating debugging of code of a computer program without the use of hooks. These methods may be employed as a hookless debug solution by extending, for example, existing debugger tools. In one implementation, the methods described below can be readily implemented by one skilled in the art to support a dbx hookless debug solution to implementing step-type operations.

The goal of a hookless debug solution as presented herein is to allow for debugging of code without the use of hooks (e.g., EX hooks in the z/OS® environment). As noted, conventionally, for debugging purposes EX hooks are inserted by the compiler at the beginning of every statement in the source program, and the runtime can be instructed to signal the debugger when an EX hook is encountered. This allows debuggers to regain control when a hook is reached. These EX hooks may be advantageously employed in situations where the debugger cannot predict where the program will go.

In accordance with the methods disclosed herein, debugging of code is facilitated or implemented by a processor, during a debugging session, a step-type operation by: setting or "sprinkling" active internal breakpoints on lines of code currently on the call stack referenced by the system processor and on entry points to the code being debugged. In one implementation, these active internal breakpoints are sprinkled on every line on every routine up the call stack and on the entry point of each routine being debugged. Subsequently, active internal breakpoints are only removed when processing encounters them during execution of another operation, and the active internal breakpoints are determined to be unnecessary for the another operation's execution. In this manner, subsequent step-type operations will not need to set as many active internal breakpoints, since many of the active internal breakpoints will remain from one or more previous step-type operations.

As used herein, an "internal breakpoint" means a breakpoint type separate from a user breakpoint, but which is also implemented by replacing an opcode with one that will cause a trap to occur when it is executed. In one embodiment, an internal breakpoint is an unconditional breakpoint, and is tracked separate from any user breakpoints. Upon encountering an internal breakpoint, the debugger handles the trap, and in doing so, gets control at the breakpoint. To resume from the breakpoint, the debugger replaces the correct opcode and lets the code run. As used herein, program control simply means that a debugger can regain control and stop execution of the code at the appropriate point to complete the step-type operation. Further, in the following description, note that a line of code may have associated therewith multiple types of breakpoints. For example, a user breakpoint, a stack-based internal breakpoint and/or an entry-point-based internal breakpoint may be associated with a particular line of code, for example, residing on the call stack or comprising an entry point of the code being debugged.

Consider that allowing code to execute will result in either: 1) a line in the current routine being encountered next (e.g., completes on this line in the routine); 2) a type of return is made to a routine on the stack being performed (in which case, the step-type operation completes on the line after the point where control is returned to the routine); or 3) a call is made to a debuggable routine (in which case the step-type operation completes on the first line of the debuggable function). The first and second possibilities are covered because the routines were on the stack when the step-type operation was performed, so they will have a stack-based internal breakpoint on every line. Further, any called routine must be entered through its entry point so the third possibility is also covered by the entry-point-based internal breakpoints. With internal breakpoints set on every line of every debuggable routine on the stack and on each entry point of every routine known to the debugger, the necessary control points are in place to perform a stepping operation and not lose control of the program.

Figure 3:
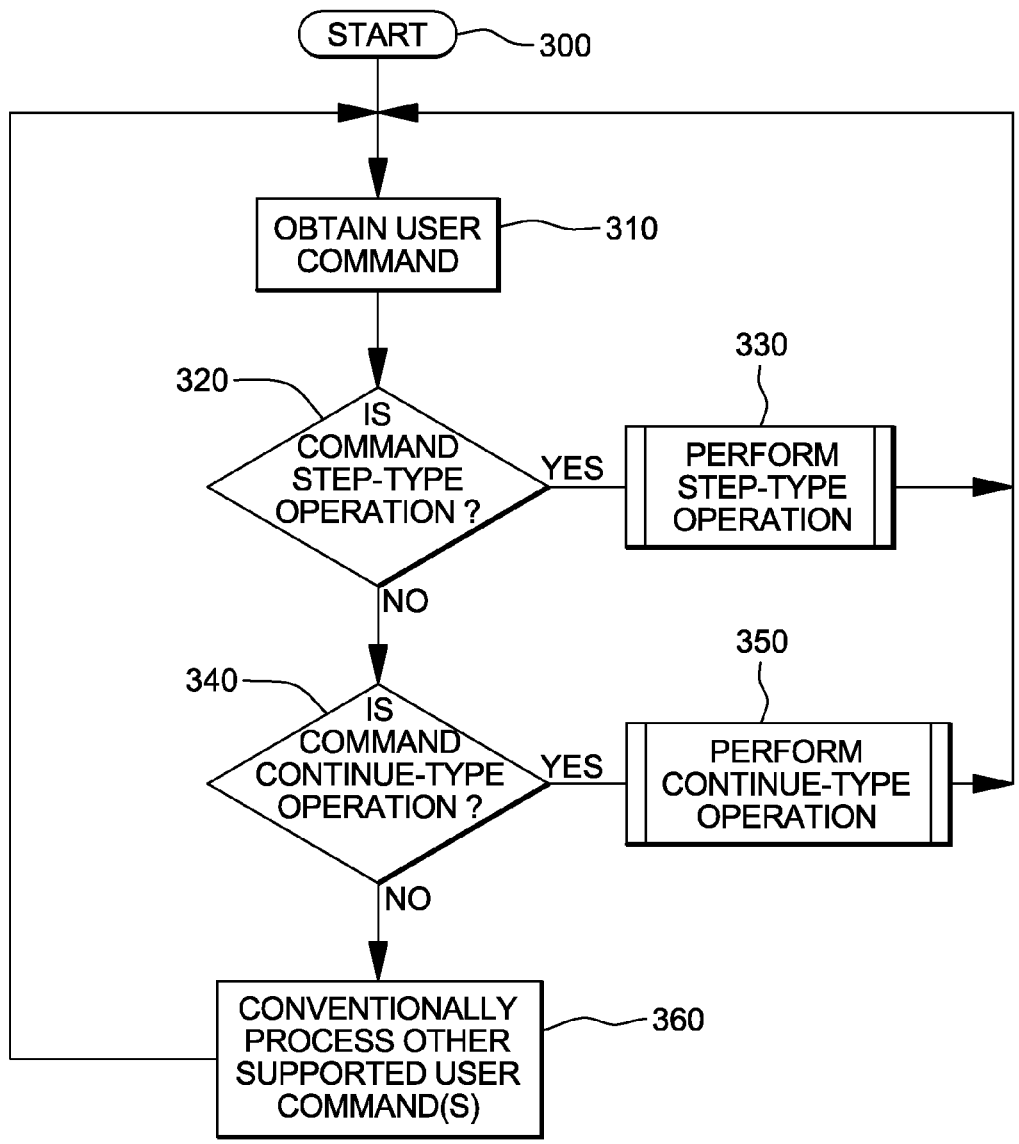
FIG. 3 is a flowchart of one embodiment of operation processing implemented by a debugger, in accordance with an aspect of the present invention.
Figure 4:
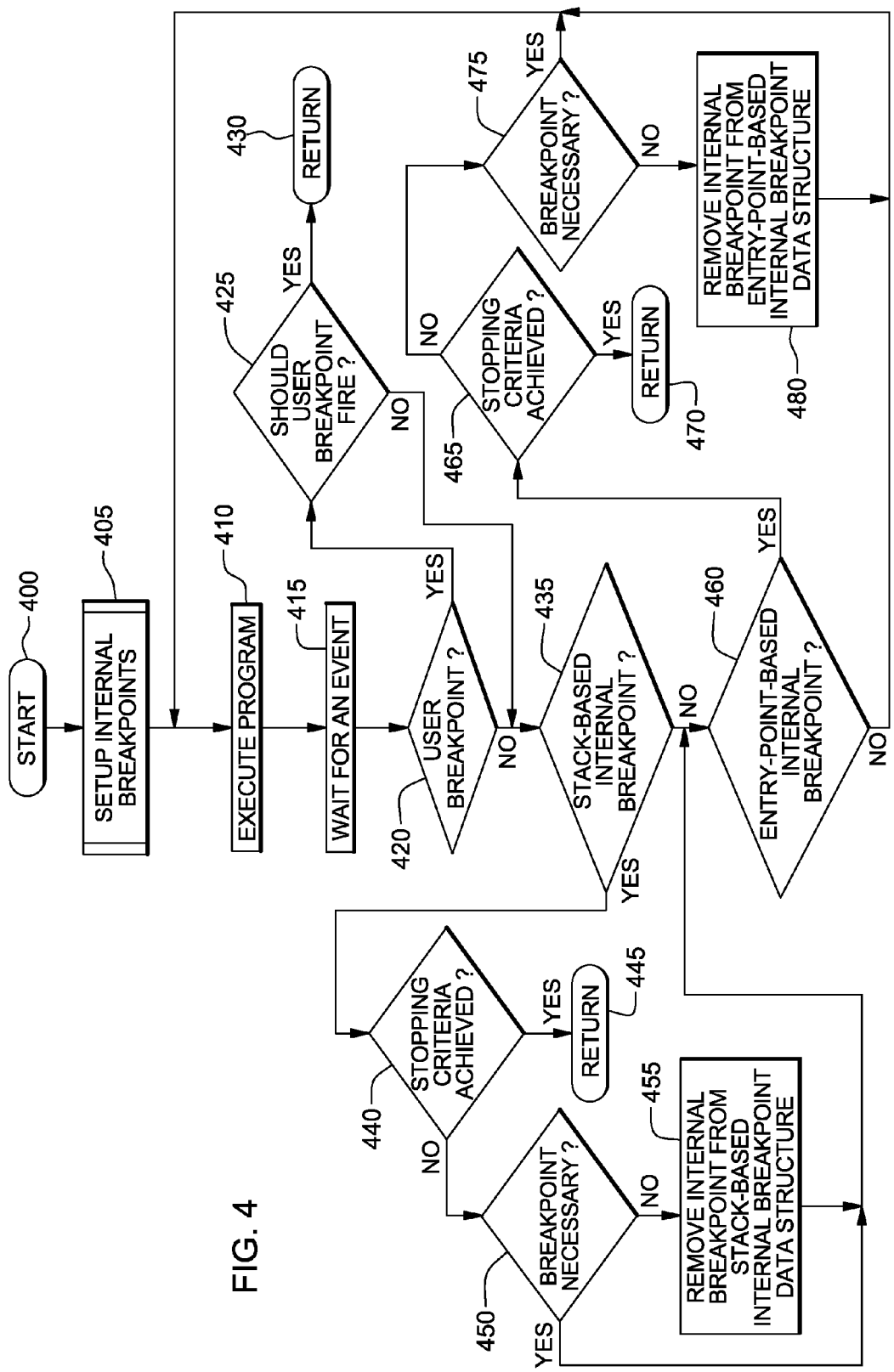
FIG. 4 is a flowchart of one embodiment of debugger processing of a step-type operation, in accordance with an aspect of the present invention.
Figure 8:
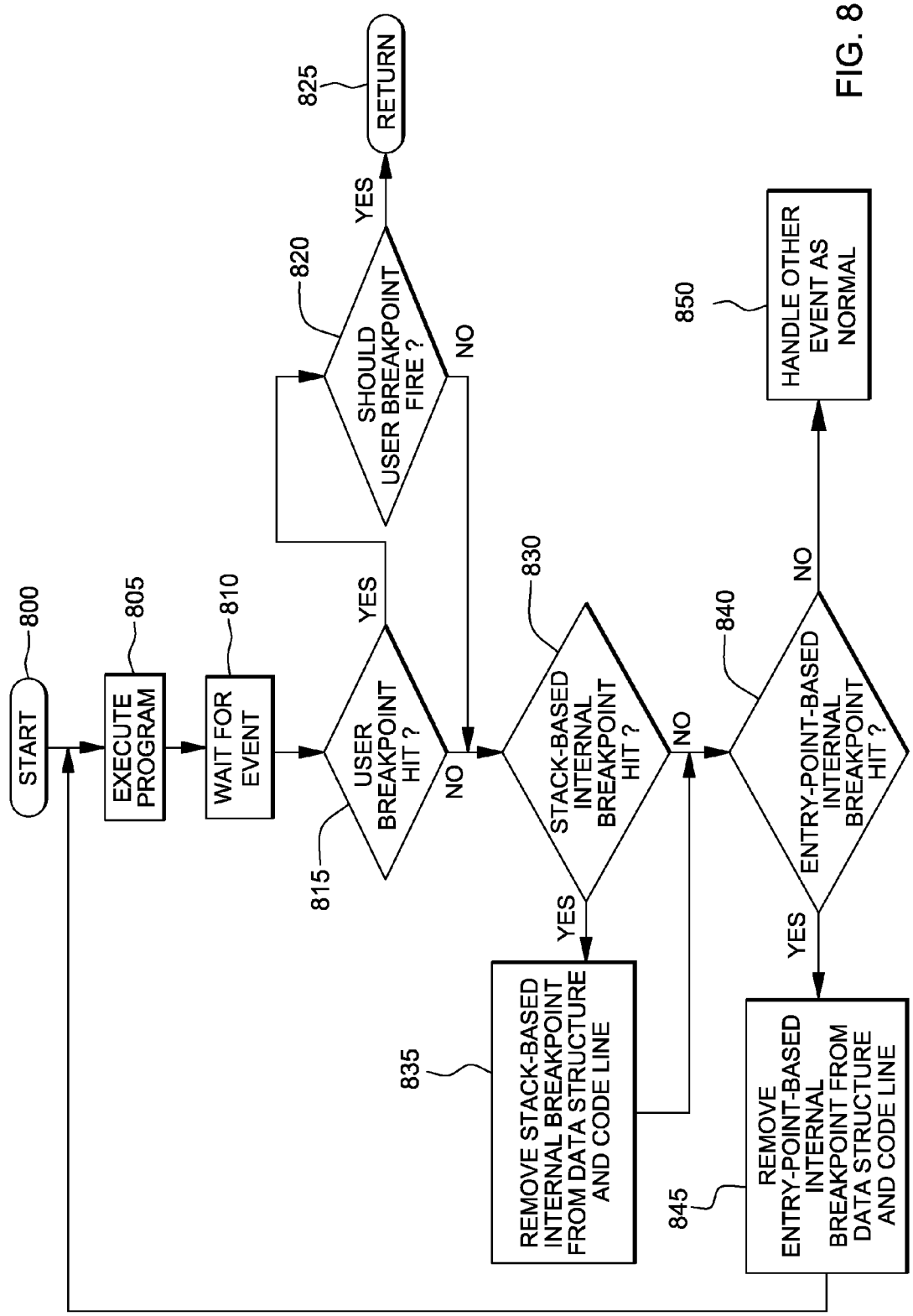
FIG. 8 is a flowchart of one embodiment of debugger processing of a continue-type operation, in accordance with an aspect of the present invention.

With the above overview, FIG. 3 depicts a method of facilitating debugging of code of a computer program, in accordance with an aspect of the present invention. The process of FIG. 3 begins 300 with obtaining a user command or action 310. Processing determines whether the command is a step-type operation 320 and if "yes", performs the step-type operation in accordance with the principles of the present invention 330. One embodiment of a process for performing a step-type operation is depicted in FIG. 4, and described below. After performing the step-type operation, processing returns to await the next user command 310. If the command is other than a step-type operation, processing determines whether the command is a continue-type operation 340, and if "yes", performs the continue-type operation in accordance with an aspect of the present invention. One embodiment of processing for performing a continue-type operation in accordance with the present invention is depicted in the process of FIG. 8. After performing the continue-type operation, processing returns to await the next user command 310. If the user command is a step-type operation or other than a continue-type operation, the command is conventionally processed 360, after which processing returns to await the next user command 310.

FIG. 4 depicts one embodiment of a process for performing a step-type operation, in accordance with an aspect of the present invention. As noted, there are a number of step-type operations, including step into, step over and return operations. By way of specific example, the dbx sub-commands next, step and return are all step-type operations that work in similar ways to implement support for hookless debug, as described herein.

Figure 5:
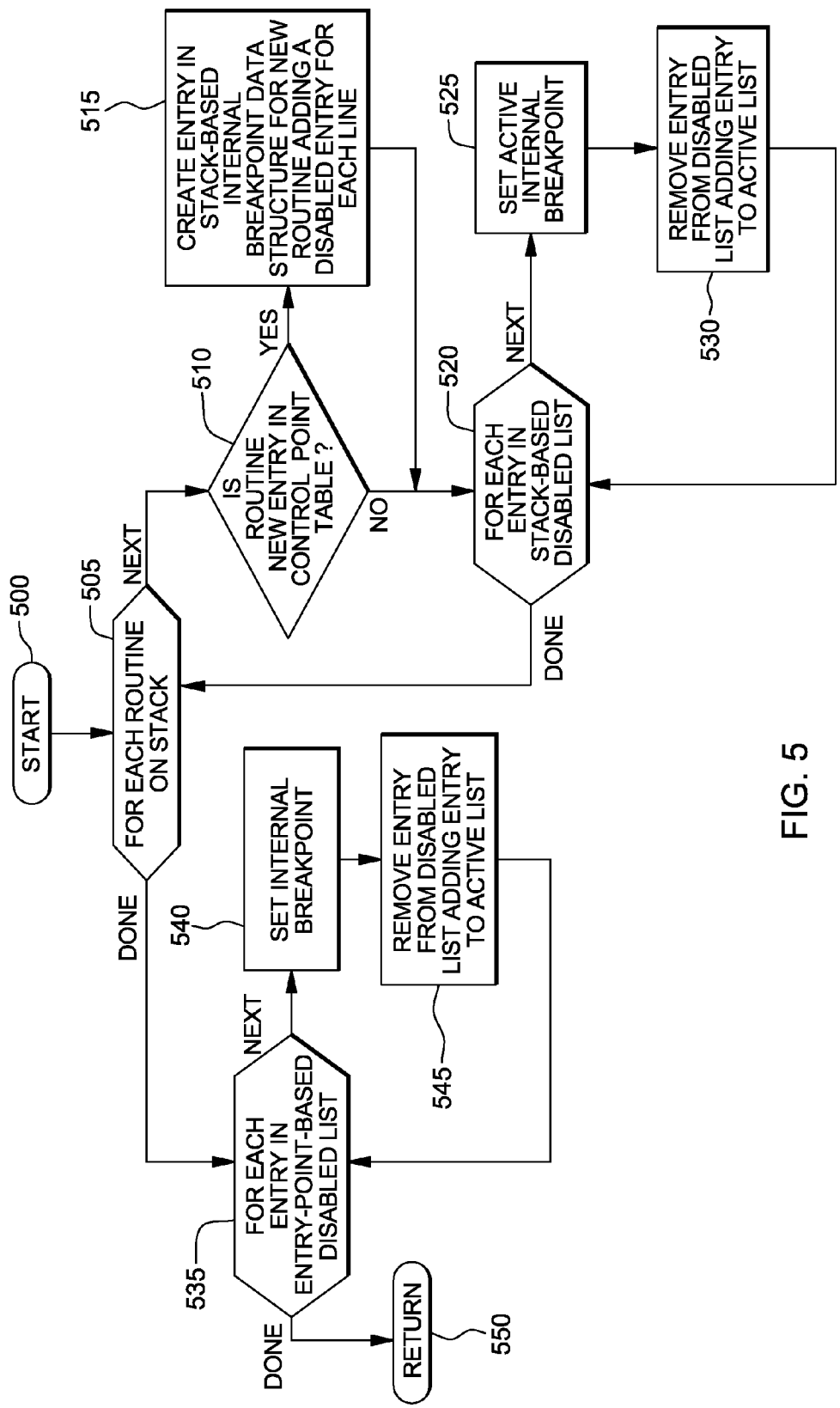
FIG. 5 is a flowchart of one embodiment of processing for setting internal breakpoints during debugger processing of a step-type operation, in accordance with an aspect of the present invention.

Step-type operation processing begins 400 by setting up internal breakpoints 405. One embodiment of a process for accomplishing this is depicted in FIG. 5, and described below. As noted above, step-type operation processing is facilitated by setting internal breakpoints on lines of code on the call stack, and on entry points of the code being debugged. These internal breakpoints are referred to as stack-based internal breakpoints and entry-point-based internal breakpoints.

After setting up the internal breakpoints, the debugger executes the program 410 and waits for an event to be hit 415. Upon occurrence of an event, processing determines whether there is a user breakpoint at that location 420. If "yes", then a check is made to determine whether the user breakpoint should fire 425. This involves, for example, determining whether there is a conditional expression or from-to-every clause associated with the user breakpoint. If so, the condition is evaluated as conventionally done, and if it is determined that a stop should occur, the routine returns 430.

Should the user breakpoint not fire, or should the event not comprise a user breakpoint, then processing determines whether the event comprises a stack-based internal breakpoint 435. Assuming that there is a stack-based internal breakpoint, then processing determines whether stopping criteria for that breakpoint has been achieved 440. For example, for a step operation, processing will always stop when the internal breakpoint is encountered, but for a next sub-command, if processing is below the stack frame when the next sub-command was initiated, then processing does not stop. Assuming that the stopping criteria is achieved, then processing returns 445, otherwise, processing determines whether the breakpoint is necessary for the operation 450. For example, if the routine that contains the internal breakpoint that was hit is not on the call stack in a position that is before the stack frame where the next sub-command was initiated (i.e., the breakpoint might be needed to handle the case that the initial routine returns), then the breakpoint is unnecessary for the current next operation and can be removed from the stack-based internal breakpoint data structure 455.

Thereafter, processing determines whether there is an entry-point-based internal breakpoint at the location where the event is hit 460. In one implementation, when setting the stack-based internal breakpoints, entry points need not be excluded. Thus, processing may set an internal breakpoint on the first line because the routine is on the call stack and may set a second one on the first line because it is an entry point to the routine. The breakpoint manager (FIG. 1) will handle such a situation. The opcode replacement will happen as normal, but because breakpoints may be stacked, the entry-based internal breakpoint data structure will need to be checked as well.

If an entry-point-based internal breakpoint exists, then processing determines whether stopping criteria has been achieved for that breakpoint 465 and if "yes", then the routine returns 470. Otherwise, processing determines whether the breakpoint is necessary for processing the operation 475, and if "yes", processing continues with execution of the program 410. Otherwise, the internal breakpoint is removed from the entry-point-based internal breakpoint data structure 480, after which the debugger continues with program execution 410.

As noted, FIG. 5 depicts one embodiment of a process for setting internal breakpoints for, for example, the step-type operation processing of FIG. 4. As illustrated in FIG. 5, once processing is begun 500, then for each routine on the call stack 505, processing determines whether the routine is a new entry in the control point table (representative of routines on the call stack) 510. If "yes", then an entry is created in a stack-based internal breakpoint data structure 515 for the routine, adding a disabled entry for each line of the routine on the call stack 515. Thereafter, processing starts setting active internal breakpoints by referencing the disabled list 520, and for each entry in the disabled list sets an active internal breakpoint 525, thereby removing the entry from the disabled list and adding it to the active list of stack-based internal breakpoints 530. Once all entries have been transitioned from the disabled list to the active list, internal breakpoints have been set for the new routine on the stack and processing determines whether there is another routine on the stack to be processed 505. Note that because the present invention leaves internal breakpoints in place, and only removes them if encountered and deemed unnecessary during execution of a subsequent operation, on many repeated steps, these disabled lists will likely be empty (meaning that the internal breakpoints were previously set active for the lines of the routines on the call stack).

Once all lines of each routine on the call stack have been set (i.e., updated) with active internal breakpoints, processing is done with the stack-based internal breakpoint, and for each entry-point-based line of code being debugged, an entry-based internal breakpoint is set 540, thereby removing the entry from the disabled list, and adding the entry to the active list for entry points 545. Note that in one implementation, the entry-point-based disabled list and entry-point-based active list are distinct lists from the stack-based disabled list and stack-based active list. Once each entry point line has been set with an internal breakpoint, processing returns, for example, to the step-type operation processing of FIG. 4.

Figure 6:
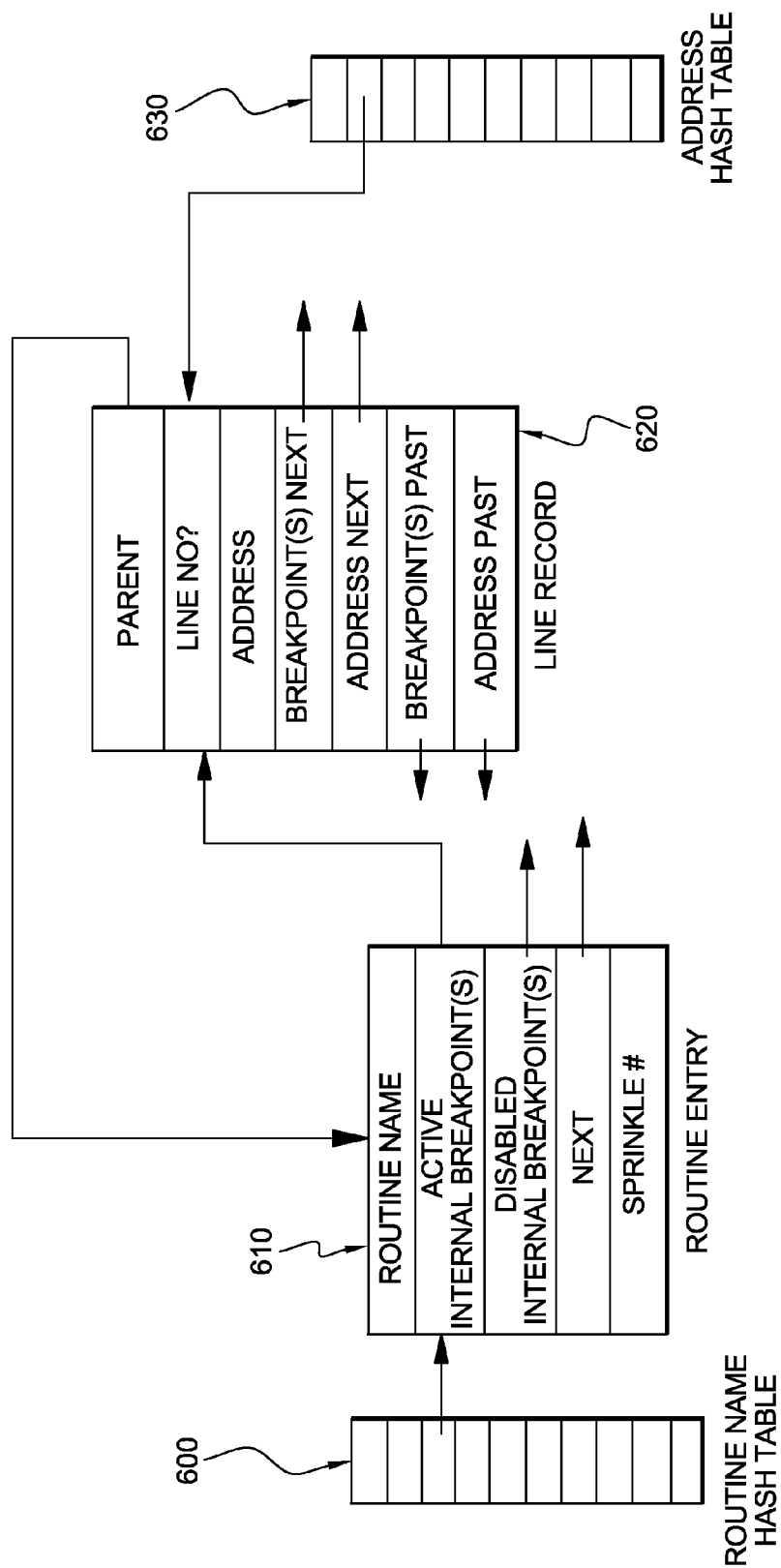
FIG. 6 illustrates one embodiment of data structures for facilitating step-type debugger operations by tracking the state of stack-based internal breakpoints associated with lines of code of a routine(s) on a call stack referenced by the system processor, in accordance with an aspect of the present invention.

FIG. 6 depicts one embodiment of data structures for facilitating the setting and removal of stack-based internal breakpoints. The stack-based data structures illustrated in FIG. 6 include a routine name hash table 600, a routine entry table 610, a line record table 620 and an address hash table 630. These data structures hold records for routines that are or have been on the call stack.

Each entry in table 610 represents a procedure or routine. These routine entries can be added at program load time or as the routines are discovered on the call stack. For each of these entries, there will be an active internal breakpoint list and a disabled internal breakpoint list. Initially, when an entry is created for a given routine, there will be a line record 620 in the disabled list for each line of the routine. When an internal breakpoint associated with that line is set, this record will be moved to the active internal breakpoint list and added to the address hash table 630. When the program is allowed to execute, one or more of these internal breakpoints will be encountered. If they are determined not to be necessary to the current operation, then they will be removed and the record associated with them will be moved from the active list to the disabled list for this entry. The record will also be removed from the address hash table 630. This way, when the routine is subsequently found on the call stack for another step operation, these internal breakpoints need not be reestablished, only the breakpoints in the disabled list will need to be set. Note that the address hash table 630 is for active line records. Only line records in the active list should be in this table, and removal of an entry from the active list implies removal of the corresponding entry from the address hash table as well.

When a routine is located on the call stack, its long name (or handle) may be used as a key to the routine name hash table 600 to locate the routine entry 610 to access the disabled list for setting the necessary internal breakpoints. When an internal breakpoint is encountered and determined not to be necessary for the current operation, the address hash table 630 will be used to locate the line record 620 for that internal breakpoint. The address hash table 630 may be keyed off the address of the opcode replaced. The line records may be chained using a doubly link list so that they can be quickly removed and inserted. The primary purpose of this is to allow for quick access that will scale to handle a large number of internal breakpoints. In one embodiment, only the new stack-based internal breakpoints described herein will be placed in this table. Existing user breakpoints will be handled as currently being handled today.

Figure 7:
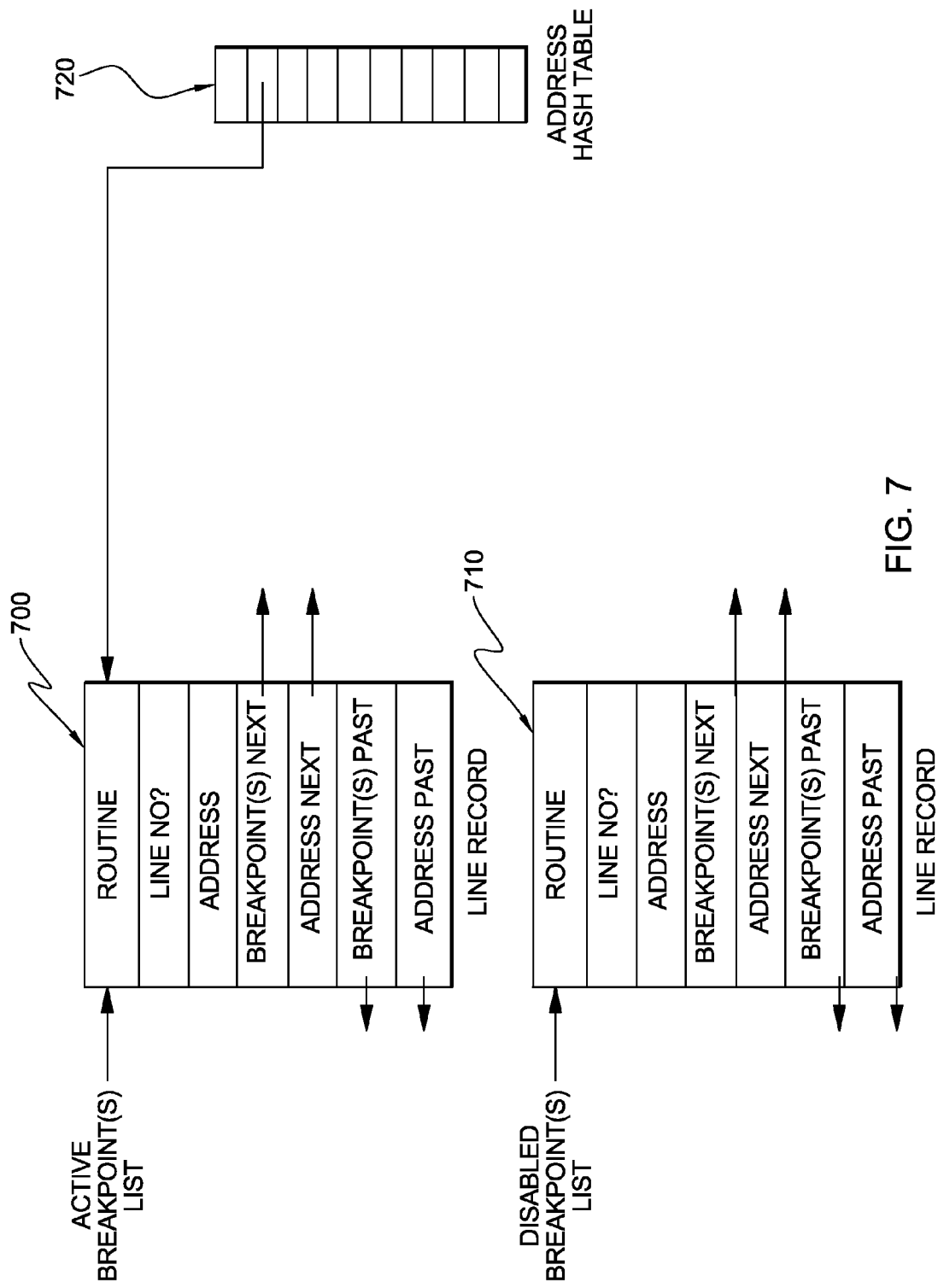
FIG. 7 depicts one embodiment of data structures for facilitating step-type debugger operations by tracking the state of entry-point-based internal breakpoints associated with entry points of the code being debugged, in accordance with an aspect of the present invention.

For internal breakpoints to be set on the entry points of each routine under debug, similar but separate lists may be employed. These lists are referred to herein as the entry-point-based data structure. One embodiment of this structure is depicted in FIG. 7. The structure can be populated as programs are loaded or added to debug. Every debuggable routine which is currently loaded should have a line record in the structure that corresponds to its entry point. The entry-point-based data structure includes an active breakpoint(s) list 700 and a disabled breakpoint(s) list 710. As illustrated, the active breakpoint(s) list 700 is accessed via an address hash table 720. When internal breakpoints are set, their line records are removed from the disabled breakpoint list 710, and added to the active breakpoint list 700 and to the address hash table 720. Address hash table 720 is for active line records only. In one embodiment, only line records in the active list are in the address hash table, and removal from the active breakpoint list 700 implies removal from the address hash table 720 as well.

As program execution proceeds, and an entry-point-based internal breakpoint is encountered, and determined to be unnecessary for the current operation, the encountered internal breakpoint will be removed by replacing the good opcode and moving the line record associated with the internal breakpoint to the disabled list 710. Concurrently, the line record will be removed from the address hash table 720, which is keyed by the address of the replaced opcode.

As noted above, when the user command/action is a continue command, then the continue operation causes processing to proceed as set out in FIG. 8. Referring to FIG. 8, once encountered 800, executing a continuation-type operation results in execution of the code of the computer program 805, during which processing waits for an event to occur 810. Once an event occurs, processing determines whether the event comprises a user breakpoint hit 815. If "yes", then processing inquires whether the user breakpoint should fire 820, and if so, processing returns 825. If the event is other than a user breakpoint hit, or if the user breakpoint should not fire, then processing determines whether the event comprises a stack-based internal breakpoint hit 830. If "yes", then the stack-based internal breakpoint, if unneeded, is removed from the active list of the data structure and from the code line 835. Thereafter, processing determines whether the event includes an entry point-based internal breakpoint hit 840. (As noted above, stoppage on a line may be the result of more than one type of breakpoint.) If "yes", then the entry point-based internal breakpoint, if unneeded, is removed from the respective active list data structure and from the code line 845, and processing continues with execution of the program 805. Otherwise, the event is handled using conventional processing 850.

The following specific example of certain aspects of the invention described above is provided (by way of example only) with reference to the following sample source code to be debugged.

```
1 #include <stdio.h>
2 int j;
3 class MyClass {
4 public:
5 MyClass( );
```

```
 6
 7 static int i;
 8
 9
10 static void Test( ) {
11 i++;
12;
13 };
14 };
15
16 MyClass::MyClass( )
17 {
18 j = 0;
19 j++;
20 }
21
22
23 int MyClass::i = 0;
24 MyClass obj;
25
26 int main( ) {
27 j = 0;
28 MyClass::Test ( );
29 MyClass::Test( );
30 obj.Test( );
31 }
32
```

At the command prompt the user types:
dbx PROGRAM-NAME
This starts the dbx debugger and brings up the dbx prompt:
(dbx64)
At the dbx prompt the user sets a breakpoint in the routine main( ) and lets and issues a continue command:

```
(dbx64) st in main
[1] stop in 'int main( )'
(dbx64) c
[1] stopped in 'int main( )' at line 26 in file "hookless_29.C" ($t1)
26 int main( ) {
```

The continue command results in the program hitting the user breakpoint in main( ). At this point the user issues the dbx list command to display the program source for the program being debugged starting at line 26:

```
(dbx64) list 26
26 int main( ) {
27 j = 0;
28 MyClass::Test( );
29 MyClass::Test( );
30 obj.Test( );
31 }
32
(dbx64)
```

At this point execution is stopped at line 26 because the user set a breakpoint at this location (st in main) and execution encountered the breakpoint.

Now the user wants to step to the next line. In this case, main( ) is the only debuggable routine on the stack so a step operation will cause a stack-based internal breakpoint to be set on every line of routine main( ) and it will set an internal entry breakpoint on the entry point of every routine in the program, that is in this case main( ) and test( ). Note again that multiple breakpoints may be handled at a single location. After these internal breakpoints are set, the program is allowed to run, and will subsequently hit one of there internal breakpoints.

```
(dbx64) step
stopped in 'int main( )' at line 27 in file "hookless_29.C" ($t1)
27 j = 0;
(dbx64)
```

So in this case it hit the internal breakpoint at line 27.

Advantageously, a second step-type operation will not have to establish (in this example) any additional breakpoints because all the internal breakpoints are still there. So the second step is very fast:

```
(dbx64) step
stopped in 'int main( )' at line 28 in file "hookless_29.C" ($t1)
28 MyClass::Test( );
(dbx64)
```

This step reaches the stack based internal breakpoint set at 28. The next step will take execution into 28.

```
(dbx64) st at 30
[2] stop at "hookless_29.C":30
(dbx64) step
stopped in 'void Test( )' at line 10 in file "hookless_29.C" ($t1)
10 static void Test( ) {
(dbx64)
```

A user breakpoint is next set on line 30 for latter, and then another step command is issued. This step command hits the entry breakpoint set on the entry to the test( ) routine.

Now there are two debuggable routines on the call stack, test( ) and main( )

```
(dbx64) where
'void Test( )'( ), line 10 in "hookless_29.C"
'int main( )'( ), line 28 in "hookless_29.C"
```

So the next step is to sprinkle internal stack-based internal breakpoints on each line of test( ) because it is now on the stack and has not previously been sprinkled.

```
(dbx64) step
stopped in 'void Test( )' at line 11 in file "hookless_29.C" ($t1)
11 i++;
```

So one more step operation hits a stack-based internal breakpoint that was set on line 11 of test( ).

Issuing a continue operation will take execution to line 30 because of the user breakpoint set above.

```
(dbx64) c
[2] stopped in 'int main( )' at line 30 in file "hookless_29.C" ($t1)
30 obj.Test( );
(dbx64)
```

In the process of continuing, any internal breakpoints encountered between line 11 and the end of the test( ) function will have been removed, and since the test( ) function was called again at line 29, the stack-based internal breakpoint associated with line 29 in routine main( ) would have been removed, and the entry-based internal breakpoint set on the entry to the test( ) routine and the stack-based internal breakpoint associated with line 11 will also have been removed.

So execution stopped at line 30. This means that routine main( ) is the only debuggable routine on the call stack.

```
(dbx64) where
    'int main( )'( ), line 30 in "hookless_29.C"
```

Therefore, routine main( ) is the only routine that needs to be sprinkled with stack-based internal breakpoints. The only internal breakpoint that was removed by the continue operation was the breakpoint at line 29, which must now be reestablished. The entry-point-based internal breakpoints must also be reestablished. In this case the entry-point-based internal breakpoint for the test( ) routine was removed by the continue operation so it must be reestablished. All other entry-point-based internal breakpoints are still set.

```
(dbx64) s
    stopped in 'void Test( )' at line 10 in file "hookless_29.C" ($t1)
    10 static void Test( ) {
    (dbx64)
```

So stepping on line 30 resulted in the internal breakpoints above being set and the entry-point-based internal breakpoint to test( ) routine was encountered and caused the step to complete.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 9:
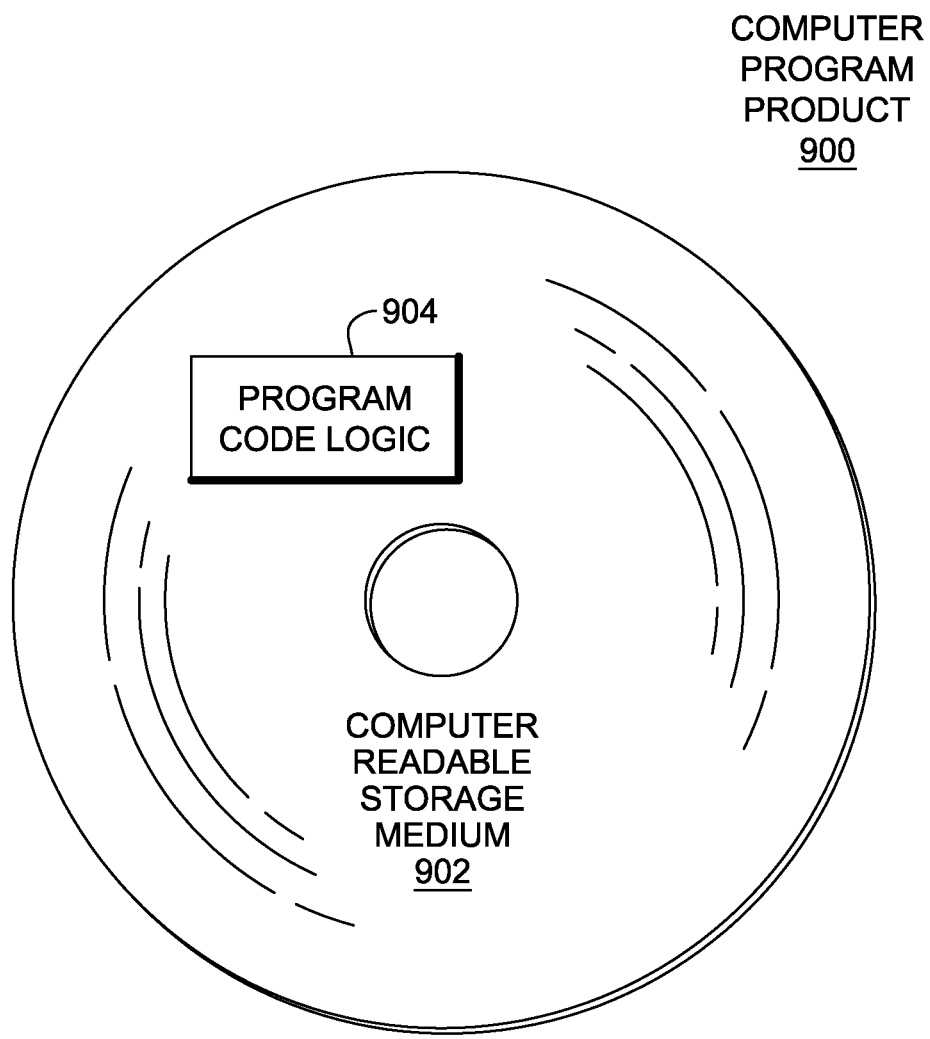
FIG. 9 depicts one embodiment of a computer program product incorporating one or more aspects of the present invention.

Referring now to FIG. 9, in one example, a computer program product 900 includes, for instance, one or more computer readable storage media 902 to store computer readable program code means or logic 904 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, other platforms and/or languages can be used without departing from the spirit of the present invention. Aspects of the invention may be performed by tools other than those described herein. Moreover, for certain steps or logic performed by a compiler, other preprocessors or preprocessing logic can be used. Therefore, the term "preprocessor" includes a compiler, any other preprocessor or preprocessor logic, and/or any type of logic that performs similar functions.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method of facilitating debugging of code of a computer program, the method comprising:

implementing by a processor, during a debugging session, a step-type operation, wherein the step-type operation enables a debugger to maintain control of the code referenced by the processor during execution independent of operating system hook support, the implementing comprising:

automatically setting a plurality of active internal breakpoints on lines of code on a call stack referenced by the processor and on entry points of the code being debugged; and leaving in place, upon completion of the step-type operation, at least one active internal breakpoint of the plurality of active internal breakpoints; and automatically disabling, subsequent to implementing the step-type operation, any active internal breakpoint of the at least one active internal breakpoint encountered during execution of at least one other operation of the code and deemed unnecessary to completion of the at least one other operation, and tracking in at least one data structure, location of any active internal breakpoint disabled during execution of the at least one other operation.

2. The method of claim 1, wherein the setting comprises setting active internal breakpoints on every line of code of every routine on the call stack referenced by the processor.

3. The method of claim 1, wherein the at least one other operation is other than a step-type operation.

4. The method of claim 1, wherein the tracking comprises tracking in at least one stack-based internal breakpoint data structure any disabled internal breakpoints on lines of code on the call stack, and tracking in at least one entry point-based internal breakpoint data structure any disabled internal breakpoints on entry points of the code being debugged.

5. The method of claim 1, further comprising implementing by the processor, during the debugging session, another step-type operation, wherein implementing the another step-type operation includes: ensuring that every line of code of every routine on the call stack has an active internal breakpoint associated therewith and that each entry point of the code being debugged has an active internal breakpoint associated therewith, wherein the ensuring comprises referencing the at least one data structure to locate any internal breakpoints disabled during execution of the at least one other operation and resetting one or more disabled internal breakpoints active responsive to the one or more disabled internal breakpoints being associated with line(s) of code currently on the call stack referenced by the processor or being associated with an entry point of the code being debugged.

6. The method of claim 2, further comprising, subsequent to implementing the step-type operation, and previous to implementing the at least one other operation of the code, implementing another step-type operation by the processor during the debugging session, wherein implementing the another step-type operation comprises reusing any previously set active internal breakpoints on lines of code currently on the call stack at time of implementing the another step-type operation and reusing previously set active internal breakpoints on entry points of the code being debugged, wherein only disabled or unset internal breakpoints for lines of code currently on the call stack need to be set active, and only disabled internal breakpoints on entry points of the code being debugged need to be set active in implementing the another step-type operation.

7. The method of claim 2, further comprising subsequently executing the code and upon encountering an event, determining whether the event is a stack-based internal breakpoint, and responsive to the event being a stack-based internal breakpoint, ascertaining whether any stopping criteria for the stack-based internal breakpoint has been achieved, and responsive to stopping criteria having been achieved, returning from execution of the code.

8. The method of claim 7, further comprising, responsive to stopping criteria not being achieved, determining whether the stack-based internal breakpoint is necessary, and responsive to the stack-based internal breakpoint being unnecessary disabling the stack-based internal breakpoint.

9. The method of claim 7, further comprising determining whether the event comprises an entry-point-based internal breakpoint, and responsive to the event comprising an entry-point-based internal breakpoint, ascertaining whether any stopping criteria associated with the entry-point-based internal breakpoint has been achieved, and responsive to stopping criteria having been achieved, returning from execution of the code.

10. A computer program product for facilitating debugging of code of a computer program, the computer program product comprising:

a computer readable storage medium readable by a processor and storing instructions for execution by the processor for performing:

implementing by a processor, during a debugging session, a step-type operation, wherein the step-type operation enables a debugger to maintain control of the code referenced by the processor during execution independent of operating system hook support, the implementing comprising:

automatically setting a plurality of active internal breakpoints on lines of code on a call stack referenced by the processor and on entry points of the code being debugged; and leaving in place, upon completion of the step-type operation, at least one active internal breakpoint of the plurality of active internal breakpoints; and automatically disabling, subsequent to implementing the step-type operation, any active internal breakpoint of the at least one active internal breakpoint encountered during execution of at least one other operation of the code and deemed unnecessary to completion of the at least one other operation, and tracking in at least one data structure, location of any active internal breakpoint disabled during execution of the at least one other operation.

11. The computer program product of claim 10, wherein the setting comprises setting active internal breakpoints on every line of code of every routine of the call stack referenced by the processor.

12. The computer program product of claim 10, wherein the performing further comprises implementing by the processor, during the debugging session, another step-type operation, wherein implementing the another step-type operation includes ensuring that every line of code of every routine on the call stack has an active internal breakpoint associated therewith and that each entry point of the code being debugged has an active internal breakpoint associated therewith, wherein the ensuring comprises referencing the at least one data structure to locate any internal breakpoints disabled during execution of the at least one other operation and resetting one or more disabled internal breakpoints active responsive to the one or more disabled internal breakpoints being associated with line(s) of code on the call stack referenced by the processor or being associated with an entry point of the code being debugged.

13. The computer program product of claim 11, wherein the performing further comprises, subsequent to implementing the step-type operation, and previous to implementing the at least one other operation of the code, implementing another step-type operation by the processor during the debugging session, wherein implementing the another step-type operation comprises reusing any previously set active internal breakpoints on lines of code currently on the call stack at time of implementing the another step-type operation and reusing previously set active internal breakpoints on entry points of the code being debugged, wherein only disabled or unset internal breakpoints for lines of code currently on the call stack need to be set active, and only disabled internal breakpoints on entry points of the code need to be set active in implementing the another step-type operation.

14. A computer system for facilitating debugging of code of a computer program, the computer system comprising:
   a memory; and
   a processor in communications with the memory, wherein the computer system is configured to perform:
   implementing by a processor, during a debugging session, a step-type operation, wherein the step-type operation enables a debugger to maintain control of the code referenced by the processor during execution independent of operating system hook support, the implementing comprising:
      automatically setting a plurality of active internal breakpoints on lines of code on a call stack referenced by the processor and on entry points of the code being debugged; and
      leaving in place, upon completion of the step-type operation, at least one active internal breakpoint of the plurality of active internal breakpoints; and
   automatically disabling, subsequent to implementing the step-type operation, any active internal breakpoint of the at least one active internal breakpoint encountered during execution of at least one other operation of the code and deemed unnecessary to completion of the at least one other operation, and tracking in at least one data structure, location of any active internal breakpoint disabled during execution of the at least one other operation.

15. The computer system of claim 14, wherein the setting comprises setting active internal breakpoints on every line of code of every routine on the call stack referenced by the processor.

16. The method of claim 1, wherein the plurality of active internal breakpoints are unconditional breakpoints and are tracked separately from any user breakpoints.

17. The computer program product of claim 10, wherein the plurality of active internal breakpoints are unconditional breakpoints and are tracked separately from any user breakpoints.

18. The computer system of claim 14, wherein the plurality of active internal breakpoints are unconditional breakpoints and are tracked separately from any user breakpoints.

* * * * *